United States Patent

Peter et al.

Patent Number: 5,183,640

Date of Patent: Feb. 2, 1993

[54] APPARATUS FOR PRODUCING RUBBER MIXTURES

[75] Inventors: Julius Peter, Dommayergasse 7, A-1130 Vienna, Austria; Günter Weckerle, Northeim, Fed. Rep. of Germany

[73] Assignees: Continental Aktiengesellschaft, Hanover, Fed. Rep. of Germany; Julius Peter, Vienna, Austria

[21] Appl. No.: 751,151

[22] Filed: Aug. 28, 1991

[30] Foreign Application Priority Data

Aug. 29, 1990 [DE] Fed. Rep. of Germany ....... 4027261

[51] Int. Cl.$^5$ .............................. C08F 6/00; B28C 7/16
[52] U.S. Cl. ................................... 422/135; 422/131; 366/75; 366/77; 366/91
[58] Field of Search ................ 523/351; 422/131, 135; 366/69, 75, 77, 91, 76, 83, 84, 85, 86

[56] References Cited

U.S. PATENT DOCUMENTS

| | | | |
|---|---|---|---|
| 3,951,389 | 4/1976 | Porter | 366/91 |
| 4,298,322 | 11/1981 | Anders et al. | 425/147 |
| 4,910,237 | 3/1990 | Peter | 523/351 |

Primary Examiner—Robert J. Warden
Assistant Examiner—Christopher Y. Kim
Attorney, Agent, or Firm—Robert W. Becker

[57] ABSTRACT

An apparatus for producing rubber mixtures, comprising: as a master batcher, a ram kneader than operates in a batch-type process; a ram-less final mixer that is disposed below the ram kneader, also operates in a batch-type process, and has a greater volume capacity than does the ram kneader, with the final mixer having a mixing chamber that is provided with rotors; an essentially vertically disposed transfer channel for the transfer of a master batch from the ram kneader to the mixing chamber of the final mixer; and one or more withdrawal or exhaust openings disposed above the mixing chamber of the final mixer in walls of at least one of the transfer channel and the mixing chamber of the final mixer.

12 Claims, 2 Drawing Sheets

APPARATUS FOR PRODUCING RUBBER MIXTURES

BACKGROUND OF THE INVENTION

The present invention relates to an apparatus and method for producing rubber mixtures, and includes, as a master batcher, a ram kneader that operates in a batch-type process, and also includes a ram-less final mixer that is disposed below the ram kneader, also operates in a batch-type process, and has a greater volume capacity than does the ram kneader, with the final mixer having a mixing chamber that is provided with rotors; an essentially vertically disposed transfer channel is provided for the transfer of a master batch from the ram kneader to the mixing chamber of the final mixer.

Starting from the recognition that during the manufacture of rubber mixtures vapors are produced that escape from these mixtures and can produce a health or safety hazard, it has already been proposed to reduce the highly volatile constituents, and hence the tendency to evolve out gas and produce voids, by kneading the mixtures in a hot state on a calender or roller mechanism in order in this manner to provide the possibility for exhaustion. However, such an exhaustion is technically complicated and in most cases is also inadequate.

It is therefore an object of the present invention to embody an apparatus of the aforementioned general type in such a way that with relatively little technical outlay, the aforementioned vapors and gases can be nearly completely removed.

BRIEF DESCRIPTION OF THE DRAWING

This object, and other objects and advantages of the present invention will appear more clearly from the following specification in conjunction with the accompanying schematic drawing, in which.

SUMMARY OF THE INVENTION

Figure 1:
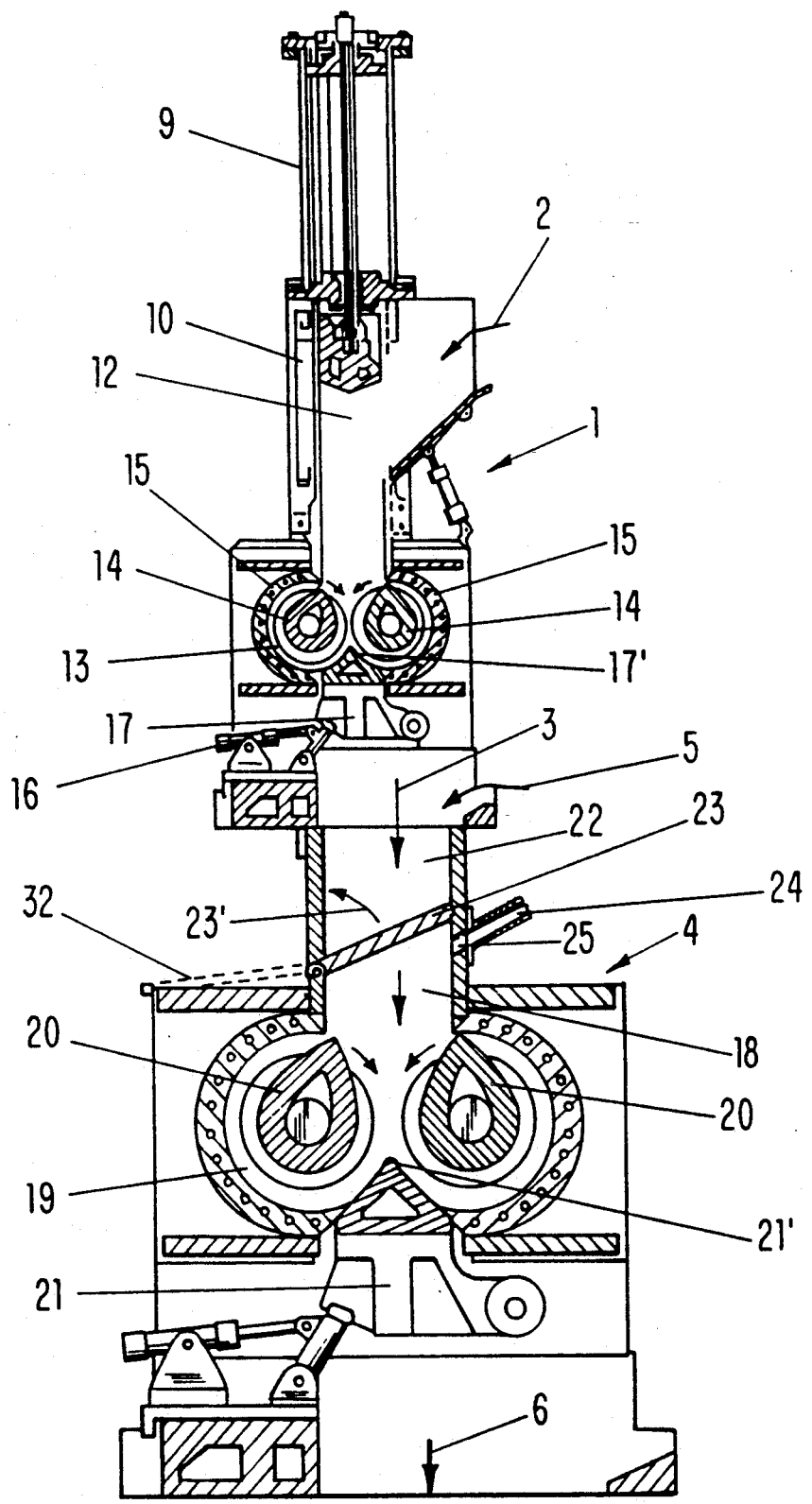
FIG. 1 is a vertical cross-sectional view through one exemplary embodiment of the inventive apparatus for producing rubber mixtures.

The apparatus of the present invention is characterized primarily in that above the hollow space or mixing chamber of the final mixer that is filled with the mixture, one or more withdrawal or exhaust openings are disposed in wall means of the hollow space and/or of the transfer channel. Associated with these exhaust openings are exhaust connections or channels that communicate with appropriate vacuum-producing means. Although the exhaust openings can be disposed in the walls of the actual mixing chamber of the final mixer, such exhaust openings are preferably disposed in the wall of the transfer channel that precedes the final mixer, since it is easier to provide openings in the transfer channel.

The gases and vapors that are withdrawn in this manner can then be removed or extracted via a freezing-out or gas scrubbing process.

The arrangement of withdrawal or exhaust openings in conjunction with the aforementioned apparatus, and in particular below the mixer or kneader that produces the master batch, is of particular significance and advantageous due to the fact that the final mixer is ram-less and is open at the top, so that it operates practically without any overpressure, and because furthermore the escape of vapor and gas from the rubber mixture is enhanced by the favorable surface/volume conditions in the interior of the final mixer and the slow operating speed (rotor speed) thereof.

Since furthermore the inside cross-sectional area of the final mixer and of the transfer channel thereof is not too great, the effort that has to be expended for the evacuation is slight. This effort can be reduced even further by providing above the withdrawal openings a closure means that can close off the transfer channel, i.e. the opening to the final mixer. This closure means can be selectively pivoted or moved between a rest position and a closure position, and vice versa. By means of such a closure means, a closed-off space is provided, the evacuation of which is effected via the withdrawal or exhaust openings. After the final mixer has been charged with the mixture produced in the master batcher, and reactive materials have been added, the aforementioned closure means is closed so that the evacuation can be carried out. After final production of the mixture, the closure means is opened to allow a renewed charging of the final mixer.

Further specific features of the present invention will be described in detail subsequently.

DESCRIPTION OF PREFERRED EMBODIMENTS

Referring now to the drawing in detail, the ram kneader 1 is provided at the top with a working cylinder 9 for raising and lowering a press or ram 10 that is moved into its upper end position shown in the drawing in order to fill the mixing chamber 13, and that can be moved downwardly in order to close off the mixing chamber 13. The materials that serve to form the master batch are supplied to the mixing chamber 13 in the direction of the arrow 2 via a hopper 12. After the materials or components have been supplied to the mixing chamber, the ram 10 is lowered to such an extent that the top of the mixing chamber 13, in which are disposed the two rotors 14, is tightly closed off. The sides of the mixing chamber 13 are closed off in a customary manner by casing parts 15. Cooling channels can also be provided in the elements of the ram kneader 1.

The master batcher is closed off at the bottom by a saddle 17 that can be pivotably moved via working cylinders 16; the top 17' of the saddle projects into the mixing chamber 13.

After the master batch has been produced, the mixing chamber 13 is opened, and hence emptied, by pivoting the saddle 17. In so doing, the master batch falls freely in a downward direction, thereby passing through vertically downwardly directed transfer channel 22 and through the always open inlet 18 into the final mixer 4, and in particular into the mixing chamber 19 thereof, which is provided with two rotors 20.

In comparison to the ram kneader 1, the final mixer 4, which is thus similarly embodied as a kneader, has a considerably larger mixing chamber 19; the rotors 20 also operate considerably slower. These measures are provided in order to carry out a cooling of the material that is being mixed.

Whereas the transfer of the mixtures from the master batcher 1 to the final mixer 4 is effected in the direction of the arrow 3, i.e. in a vertical direction, the reactive materials that are necessary for producing the final mixture are supplied from the side in the direction of the arrow 5.

When the final rubber mixture is completed, the hinged saddle 21 is pivoted downwardly to allow a discharge of the material in the direction of the arrow 6. The rubber mixture is then further processed on a drum or a discharge screw conveyor.

Associated with the transfer channel 22 is a pivotable closure means 23 that can be pivoted about a horizontal axis and that in the position illustrated in FIG. 1 can tightly close off the transfer channel 22. It is to be understood that in order to transfer the rubber mixture, the closure means 23 is pivoted upwardly in the direction of the arrow 23', whereby the closure means can form a side wall of the transfer channel 22; this is then the vertical position of the closure means 23. In addition, a downwardly inclined conduit connection 24 opens out into the transfer channel 22 between the closure means 23 and the mixing chamber 19; this conduit connection 24 can be connected to a vacuum pump or the like via an appropriate line. Such a vacuum connection is shown as being disposed at an incline because in such a position the connection is not able to receive mixture that is falling down. For the same reason, the openings 25 in the transfer channel 22 are inclined upwardly.

The closure means 23 is closed and the space between the closure means 23 and the material that is to be mixed is evacuated when the reactive materials are supplied to the rubber mixture that is in the final mixer 4. The harmful or damaging vapors and gases that then result are drawn off and can be extracted at some other location by a freeze-out or gas scrubbing process.

Since the rotors 20 turn much slower than do the rotors 14, and since in addition the interior of the final mixer 4, again in comparison to the master batcher 1, provides a larger volume with greater free surfaces for the mixtures, a removal of the aforementioned gases and vapors is enhanced and facilitated, and in particular can be effected in a shorter period of time. The thus finished mixtures are free of light or highly volatile constituents and can be further processed without difficulty, even at higher temperatures.

Figure 2:
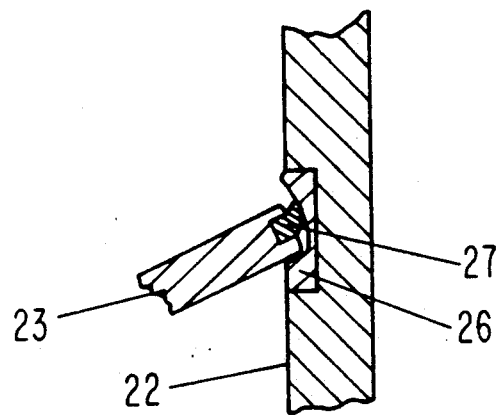
FIGS. 2 and 3 are detailed views showing two alternatives for the transfer channel.
Figure 3:
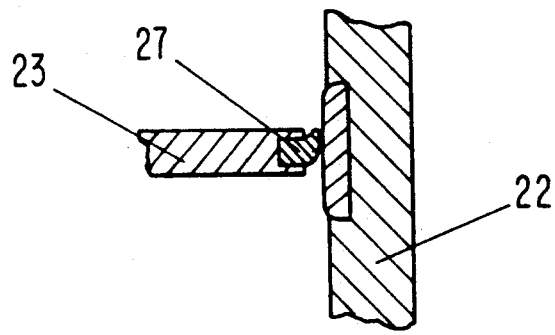

For manufacturing reasons, and also in order to achieve a good seal, the closure means 23 extends upwardly at an angle from its pivot axis. At its free end, the closure means 23 is disposed on a fixed abutment 26 of the transfer channel 22 (FIG. 2). In addition, a resilient sealing strip 27 is provided that is secured to the free end of the closure means 23 and rests with tension against the inside of the transfer channel 22. To the extent that the closed position of the closure means 23 is ensured by other abutment means, it is also possible, as shown in FIG. 3, for the closure means to have a horizontal operative position and to rest against the transfer channel in only a sealing manner.

Figure 4:
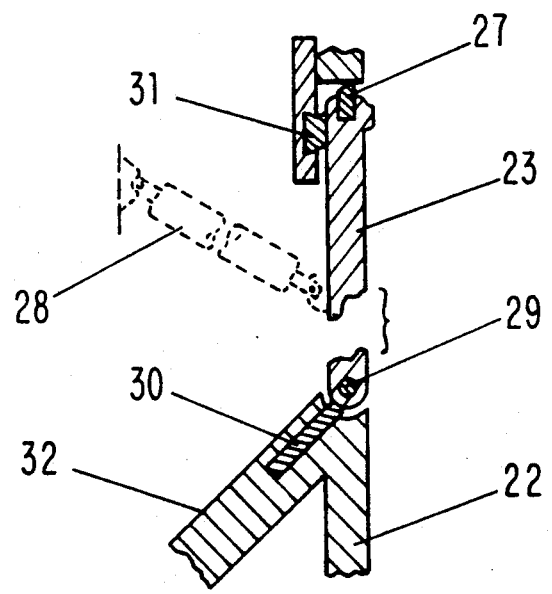
FIG. 4 is a vertical cross-sectional view showing a detail of the transfer channel, but on the opposite side relative to FIGS. 2 and 3.

FIG. 4 shows the closure means 23 in the vertical or rest position; the closure means can be pivoted by a working cylinder 28, which is indicated by dashed lines. In order to provide a sufficient seal in t he area of the pivot connection, a sealing member 30 that is under spring tension is provided in the vicinity of the pivot axis or shaft 29. In addition, at the top the back side of the closure means 23 rests against a resilient stop means 31 of the transfer channel 22. In this connection, the open closure means 23 is disposed in a recess so that the flow of material within the transfer channel 22 will not encounter any obstruction.

Beyond the transfer channel 22, behind the pivot shaft 29, an inclined surface 32 that is inclined downwardly toward the rear is provided to carry off any material that might be present.

It should be noted that further openings 25 could also be provided. In addition, such openings could also extend through the upper walls of the mixing chamber 19, although it is easier to provide such openings 25 in the transfer channel 22. Furthermore, a closure means 23 would not be absolutely necessary if the transfer channel 22 can be readily closed off in a comparable manner for easy evacuation thereof. However, again in this situation better and easier possibilities are provided if the closure means 23, which can be hermetically sealed, is used as shown in the drawing. The task of all of these measures is that the process of mixing the reactive materials into the final mixer kneader can be carried out accompanied by simultaneous exhaustion and/or evacuation.

The present invention is, of course, in no way restricted to the specific disclosure of the specification and drawing, but also encompasses any modifications within the scope of the appended claims.

What we claim is:

1. An apparatus for producing rubber mixtures, comprising:
    a master batcher, comprising a ram kneader that operates in a batch process;
    a ram-less final mixer that is disposed below said ram kneader, also operates in a batch process, and has a greater volume capacity than does said ram kneader, with said final mixer having a mixing chamber that is provided with rotors;
    an at least substantially vertically disposed transfer channel that interconnects said ram kneader to said final mixer and serves for the transfer of a master batch from said ram kneader to said mixing chamber of said final mixer;
    at least one exhaust opening disposed above said mixing chamber of said final mixer in wall means of at least one of said transfer channel and said mixing chamber of said final mixer; and
    means for sealingly closing off said transfer channel above said at least one exhaust opening.

2. An apparatus according to claim 1, in which said at least one exhaust opening is disposed in wall means of said transfer channel.

3. An apparatus according to claim 2, in which said at least one exhaust opening and associated conduit connection means extend upwardly at an angle such that the lowest portion thereof faces said transfer channel.

4. An apparatus according to claim 5, which includes means communicating with said at least one exhaust opening for removing volatile constituents from an exhausted volume.

5. An apparatus according to claim 1, in which said means for closing off said transfer channel comprises a pivotable closure means that has a horizontal pivot axis.

6. An apparatus according to claim 5, in which said closure means has a rest position in which it rests against an inside surface of wall means of said transfer channel.

7. An apparatus according to claim 5, in which said closure means has a rest position in which it forms a portion of wall means of said transfer channel.

8. An apparatus according to claim 5, in which said closure means has an operating position in which it extends upwardly at an angle from said pivot axis thereof.

9. An apparatus according to claim 5, which includes sealing strip means that are disposed between wall means of said transfer channel and the region of at least one of said pivot axis of said closure means and a free end thereof remote from said pivot axis.

10. An apparatus according to claim 5, in which a rearwardly and downwardly inclined surface means is disposed externally of said transfer channel and behind said pivot axis of said closure means.

11. An apparatus according to claim 8, in which said closure means, in said operating position, has a free end thereof remote from said pivot axis resting on a fixed abutment of said transfer channel.

12. An apparatus according to claim 5, in which said closure means, in an operating position thereof, produces a hermetically closed off hollow space above a rubber mixture in said mixing chamber of said final mixer.

* * * * *